Patented Aug. 2, 1927.

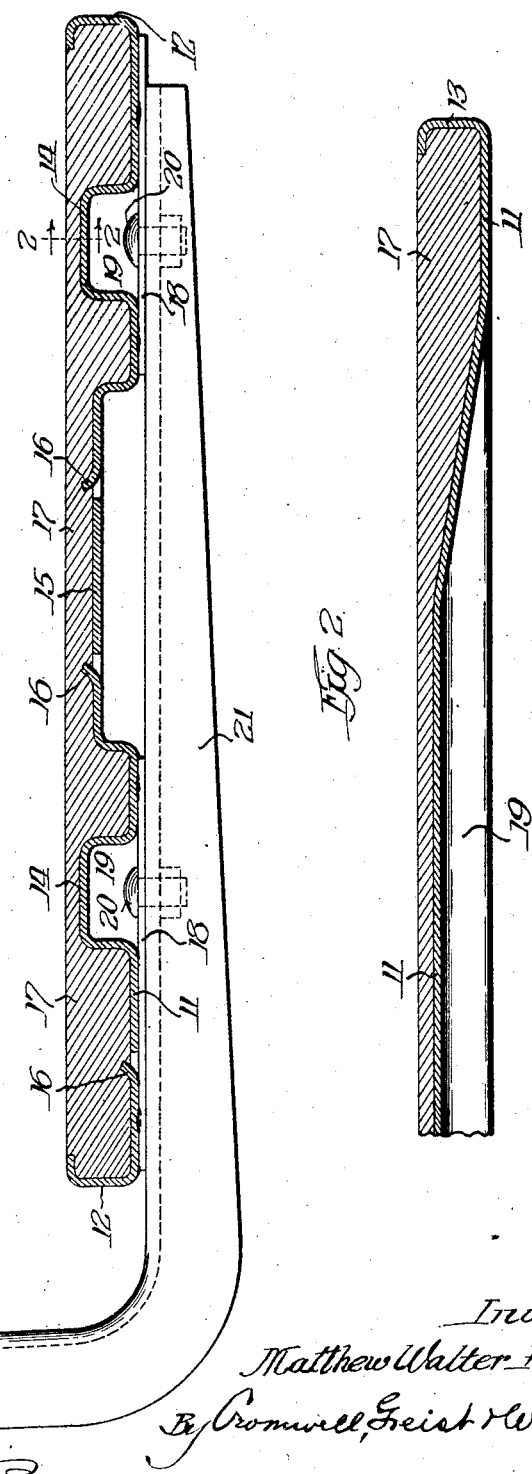

1,637,570

UNITED STATES PATENT OFFICE.

MATTHEW WALTER HUBER, OF CHICAGO, ILLINOIS, ASSIGNOR TO MOTOR WHEEL CORPORATION, OF LANSING, MICHIGAN, A CORPORATION OF MICHIGAN.

RUNNING BOARD.

Application filed January 12, 1925. Serial No. 1,805.

The present invention has to do with the provision, as an article of manufacture, of a unitary practically integral, though composite, running board structure adapted for manufacture and sale as a standard fitting for application to vehicles.

In the accompanying drawing, wherein Figure 1 is a transverse section, and Figure 2 a fragmentary longitudinal section, I have illustrated an embodiment of the invention as applied to an automobile, although it is obvious the same is adapted to other vehicles, and susceptible of changes in form and contour to suit particular conditions of use.

In the embodiment illustrated, an improved running board structure is shown as comprising a sheet metal base member 11 having flanged inwardly turned marginal sides 12 and ends 13, and also provided with parallel upwardly facing ribs 14 and a median wider rib 15 of less height than the ribs 14. Both the ribs 14 and 15 have their upper faces disposed below the horizontal plane of the inturned margins of the flanges 12 and 13. One or both of the trough bottoms formed alongside the ribs 14, and also the upper face of the rib 15 are provided, by punching, with upwardly projecting spurs 16 to serve as an interlock with the tread body 17 of a hardened originally plastic substance, which may be of any suitable composition, now known and used as a tread filling for floors and the like, such, for example, as an asphaltic binder with a filler of comminuted wood or cork; no claim being made herein for the novelty of the composition per se.

Metal plates 18 are spotwelded or otherwise permanently secured to the bottom of the base member 11, preferably bridging the recesses 19 beneath the ribs or elevations 14, these plates 18 serving with the bolts 20, to affix the running board detachably to the hanger irons 21 of an automobile or other vehicle.

The height of the ribs 14 is substantially less than that of the sides and ends 12 and 13 in order to provide spaces thereabove for a sufficiently thick layer of tread composition, while the lesser height of the median rib 15 affords space for a greater thickness of tread composition thereabove where the wear is excessive. The interlocking of the sheet metal base with the tread composition, by means of the spurs 16, constitutes a substantially integral structure of the metal and composition.

The longitudinally extending ribs 14 and 15 are advantageously modified adjacent the ends of the running board to provide a maximum thickness of tread material at the ends and to give to the exterior at both the sides and ends a uniform unbroken face.

I am aware that it is old, in the building art, to fill in floors and the like in situ with a tread composition of originally plastic material, but my invention constitutes the provision of an article of manufacture, complete, carried in stock for sale to automobile manufacturers, and all ready for application to the vehicle.

I claim:

As an article of manufacture, a running board for vehicles comprising a sheet metal pan-like base containing a hardened originally plastic composition, the base having longitudinally extending elevations of less height than the pan depth, a metal plate fixedly secured to the lower face of the pan and bridging the recess formed beneath the elevations, and bolts for removably attaching the plates to the hanger brackets of the vehicle with the bolt heads accommodated within the recess above the plates.

In testimony whereof I have hereunto signed my name.

MATTHEW WALTER HUBER.